US011993078B2

(12) United States Patent
Sakaihara et al.

(10) Patent No.: US 11,993,078 B2
(45) Date of Patent: May 28, 2024

(54) RECORDING DEVICE AND RECORDING METHOD

(71) Applicant: SEIKO EPSON CORPORATION, Tokyo (JP)

(72) Inventors: Shun Sakaihara, Nagano (JP); Yuya Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 17/815,583

(22) Filed: Jul. 28, 2022

(65) Prior Publication Data

US 2023/0031150 A1 Feb. 2, 2023

(30) Foreign Application Priority Data

Jul. 30, 2021 (JP) ................................ 2021-125498

(51) Int. Cl.
*B41J 29/393* (2006.01)
*B41J 2/045* (2006.01)

(52) U.S. Cl.
CPC ....... *B41J 2/04508* (2013.01); *B41J 2/04586* (2013.01)

(58) Field of Classification Search
CPC ... B41J 29/393; B41J 29/38; B41J 2029/3935
See application file for complete search history.

(56) References Cited

U.S. PATENT DOCUMENTS

| | | | | |
|---|---|---|---|---|
| 2009/0189937 | A1 * | 7/2009 | Naruse | B41J 29/393 347/13 |
| 2014/0204144 | A1 | 7/2014 | Ishikawa et al. | |

FOREIGN PATENT DOCUMENTS

| | | | | |
|---|---|---|---|---|
| CN | 1713087 A | * 12/2005 | | G03G 15/5041 |
| JP | H06143705 A | * 5/1994 | | |
| JP | 2002-003003 A | 1/2002 | | |
| JP | 2014-141027 A | 8/2014 | | |

OTHER PUBLICATIONS

Takayuki, Machine TranslationofCN-1713087-A, 2005 (Year: 2005).*
Munakata, MachineTranslationofJPH06143705A, 1994 (Year: 1994).*

* cited by examiner

*Primary Examiner* — Scott A Richmond
(74) *Attorney, Agent, or Firm* — Global IP Counselors, LLP

(57) ABSTRACT

A recording device including: a liquid ejecting unit configured to eject liquid to a first surface of a medium transported in a transport direction, a roller disposed downstream of the liquid ejecting unit in the transport direction and configured to rotate in contact with the first surface, and a control unit, wherein the control unit is configured to form a first pattern of the liquid on the first surface by controlling ejection of the liquid by the liquid ejecting unit, and to form a detection region for the first pattern at a specific position on the first surface at which the roller is brought into contact with the first surface when a rotational angle of the roller becomes m °+360°, m ° being a rotational angle of the roller when the roller is brought into contact with the first pattern.

11 Claims, 7 Drawing Sheets

RECORDING DEVICE AND RECORDING METHOD

The present application is based on, and claims priority from JP Application Serial Number 2021-125498, filed Jul. 30, 2021, the disclosure of which is hereby incorporated by reference herein in its entirety.

BACKGROUND

1. Technical Field

The present disclosure relates to a recording device configured to perform recording by ejecting liquid to a recording medium, and a recording method performed by the recording device.

2. Related Art

In an inkjet printer that ejects ink to a medium, there has been known a configuration that includes a roller configured to transport a medium further downstream by rotating while coming into contact with the medium, on a downstream side of a head that ejects ink in a transport direction. When the roller is in contact with the medium after recording, a problem may occur where a portion of the ink on the medium sticks to the roller, and the ink sticking to the roller is transferred to the medium, as a result, the medium is stained.

There has been disclosed a recording device in which a sheet ejecting roller and a transport spur are disposed downstream of a recording head and a platen in a transport direction (see, JP-A-2014-141027). According to JP-A-2014-141027, a sheet after recording is transported along the transport direction in a state where the sheet is sandwiched between the sheet ejecting roller and the transport spur. A tooth portion is formed on a periphery of the transport spur and hence, a contact area of the transport spur with a surface of a sheet on which recording is performed is small. Accordingly, it is possible to suppress the transfer, to the sheet, of the ink sticking to a rotating body for transporting the sheet to some extent.

It is necessary to prevent deterioration of recording quality caused by sticking of the ink to the roller. In view of the above, there is a demand for a technique that serves to detect an effect on a recoding result attributed to sticking of ink to the roller. Further, in the configuration disclosed JP-A-2014-141027, there is a concern that an indentation generated by biting of the tooth portion of the spur into the medium affects the recording quality.

SUMMARY

A recording device including: a liquid ejecting unit configured to eject liquid to a first surface of a medium transported in a transport direction, a roller disposed downstream of the liquid ejecting unit in the transport direction and configured to rotate in contact with the first surface, and a control unit, wherein the control unit is configured to form a first pattern of the liquid on the first surface by controlling ejection of the liquid by the liquid ejecting unit, and to form a detection region for the first pattern at a specific position on the first surface at which the roller is brought into contact with the first surface when a rotational angle of the roller becomes m °+360°, m ° being a rotational angle of the roller when the roller is brought into contact with the first pattern.

A recording method performed by a recording device that includes: a liquid ejecting unit configured to eject liquid to a first surface of a medium transported in a transport direction, and a roller disposed downstream of the liquid ejecting unit in the transport direction and configured to rotate in contact with the first surface, wherein the method comprising a pattern forming step in which a first pattern of the liquid is formed on the first surface by the liquid ejecting unit, and a detection region for the first pattern is formed at a specific position on the first surface at which the roller is brought into contact with the first surface when a rotational angle of the roller becomes m °+360°, m ° being a rotational angle of the roller when the roller is brought into contact with the first pattern.

DESCRIPTION OF EXEMPLARY EMBODIMENTS

Embodiments of the present disclosure will be described below with reference to respective drawings. Here, each of the drawings is merely illustrative for describing the present embodiment. Since the respective drawings are illustrative, proportions and shapes of the constitutional elements may not be precise or may not match each other and, further, may be partially omitted.

Figure 1:
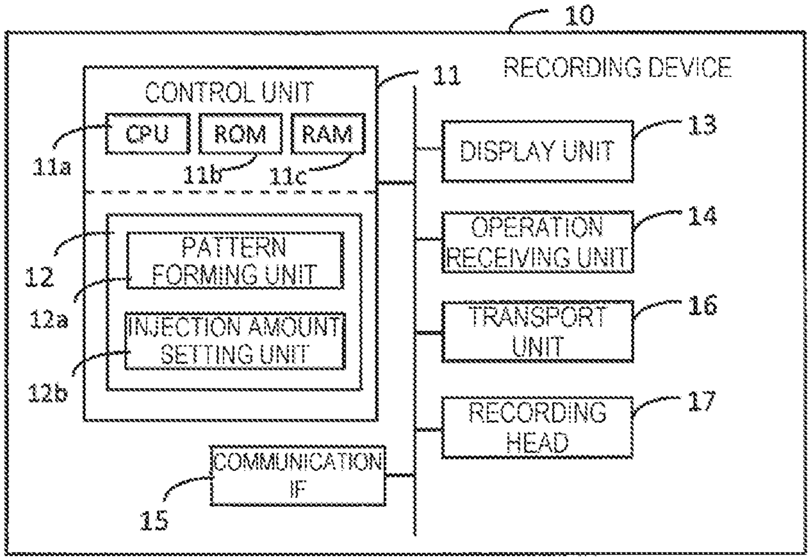
FIG. 1 is a block diagram illustrating a configuration of a device according to a present embodiment in a simplified manner.

1. Schematic Description of Device:

FIG. 1 illustrates a configuration of a recording device 10 according to a present embodiment, in a simplified manner. The recording device 10 is provided with a control unit 11, a display unit 13, an operation receiving unit 14, a communication IF 15, a transport unit 16, a recording head 17, and the like. IF is an abbreviation for interface. A recording method is implemented by the recording device 10.

The control unit 11 is configured to include, as a processor, one or a plurality of ICs including a CPU 11*a*, a ROM 11*b*, a RAM 11*c*, and the like, other non-volatile memories, and the like. In the control unit 11, the processor, that is, the CPU 11*a* executes arithmetic processing in accordance with a program 12 stored in the ROM 11*b*, other memories, or the like, using the RAM 11*c* or the like as a work area. By following the program 12, the control unit 11 realizes a plurality of functions such as a pattern forming unit 12*a*, an input amount setting unit 12*b*, and the like. The processor is not limited to the single CPU, and a configuration may be adopted in which the processing is performed by a plurality of CPUs, a hardware circuit such as an ASIC, or the like, or a configuration may be adopted in which the CPU and the hardware circuit perform the processing in corporation with each other.

The display unit 13 is a unit for displaying visual information, and is constituted, for example, of a liquid crystal display, an organic EL display, or the like. The display unit 13 may be configured to include a display and a driving circuit for driving the display. The operation receiving unit 14 is a device for receiving an operation by a user, and is realized, for example, by a physical button, a touch panel, a mouse, a keyboard, or the like. As a matter of course, the touch panel may be realized as a function of the display unit 13. The display unit 13 and the operation receiving unit 14 may also be collectively referred to as an operating panel of the recording device 10.

The display unit 13 and the operation receiving unit 14 may be a part of the configuration of the recording device 10, or may be peripheral equipment externally mounted on the recording device 10.

The communication IF 15 is a generic term for one or a plurality of IFs for executing the communication between the recording device 10 and the outside in a wired or wireless manner, in accordance with a predetermined communication protocol including a known communication standard. The control unit 11 is configured to communicate with a personal computer, a server, a smartphone, a tablet type terminal, or the like, that is not illustrated in the drawing, via the communication IF15, for example.

The transport unit 16 is a unit for transporting a sheet-shaped medium along a predetermined transport direction under the control by the control unit 11, and includes a roller configured to rotate to transport a medium, a motor for driving the roller, and the like. Although the medium is typically paper, the medium may be a medium made of a material other than paper provided that recording by liquid can be performed.

The recording head 17 has a plurality of nozzles not illustrated in the drawing, is configured to eject liquid such as ink from the respective nozzles to a medium transported by the transport unit 16 under the control by the control unit 11. The recording head 17 corresponds to a "liquid ejecting unit". The recording head 17 may be referred to as a liquid ejecting head, a printing head, a printing head, an inkjet head, or the like. A liquid droplet that the recording head 17 ejects from the nozzle is also referred to as a dot.

It is known that the recording device 10 is configured to eject or not eject dots from the respective nozzles by controlling the application of drive signals to drive elements not illustrated in the drawing that the respective nozzles include in accordance with recording data. The recording head 17 is configured to perform recording by ejecting, for example, inks of respective colors, such as cyan (C), magenta (M), yellow (Y), and black (K), inks of colors other than these colors, and liquid other than the inks.

Figure 2:
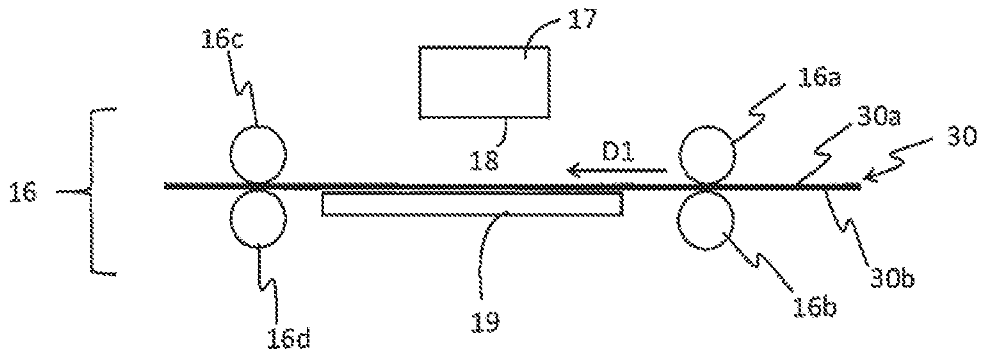
FIG. 2 is a view illustrating the relationship and the like between a recording head and a medium and the like in a simplified manner as viewed in a width direction.
Figure 3:
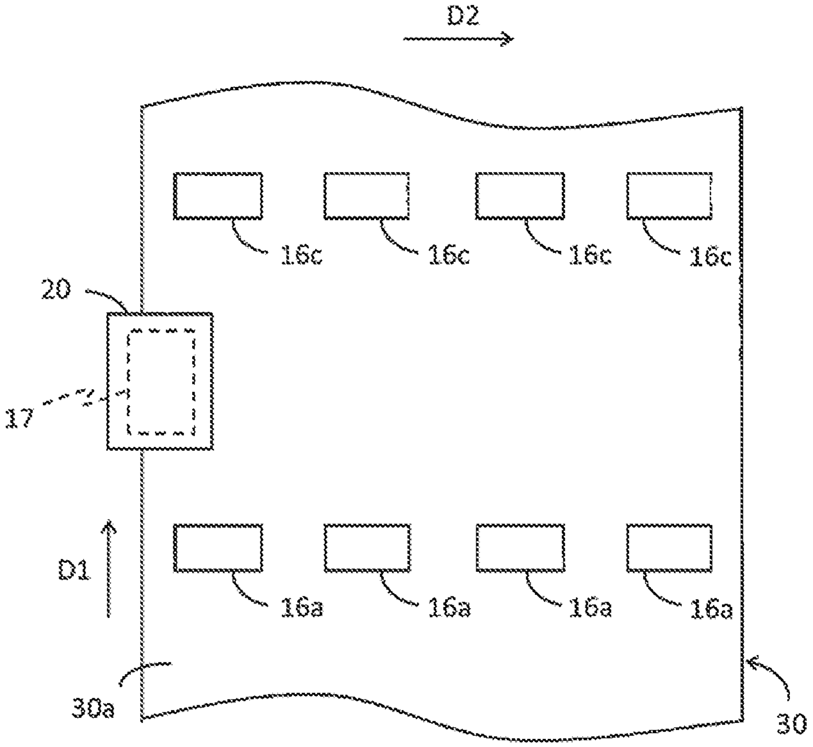
FIG. 3 is a view illustrating the relationship and the like between the recording head and the medium in a simplified manner as viewed from above.

FIG. 2 illustrates the relationship and the like between the recording head 17 and a medium 30 in a simplified manner as viewed in a width direction intersecting with a transport direction D1. In this specification, intersection between the transport direction D1 and the width direction means that the transport direction D1 and the width direction are orthogonal or nearly orthogonal to each other. A side upstream in the transport direction D1 and a side downstream in the transport direction D1 are simply referred to as an upstream side and a downstream side. In FIG. 3 described later, the width direction is indicated as a width direction D2. Symbol 19 indicates a platen 19 serving as a part of a transport path of the medium 30. The platen 19 supports the medium 30 transported along the transport direction D1 from below. The recording head 17 is supported at a position above the platen 19 so as to face the platen 19.

A first roller pair formed of a first roller 16*a* and a second roller 16*b* is disposed upstream of the recording head 17. Further, a second roller pair formed of a third roller 16*c* and a fourth roller 16*d* is disposed downstream of the recording head 17. These roller pairs are a part of the transport unit 16. Each roller pair is configured to transport the medium 30 by rotating in a state where the medium 30 is sandwiched between rollers provided in pair. The rollers included in the transport unit 16 are not limited to the rollers illustrated in the drawing.

A lower surface of the recording head 17 that faces the platen 19 is a nozzle surface 18 where the plurality of nozzles open, and the ink is ejected to the medium 30 that is supported by the platen 19 from respective nozzles that open at the nozzle surface 18. As can be understood from FIG. 2, the recording is performed by ejecting ink to a first surface 30*a* out of the first surface 30*a* and a second surface 30*b* of the medium 30, the first surface 30*a* faces the nozzle surface 18, and the second surface 30*b* is a back surface of the first surface 30*a*. Accordingly, in an example illustrated in FIG. 2, the third roller 16*c* constituting the second roller pair corresponds to "a roller disposed downstream of the liquid ejecting unit and rotating in contact with the first surface 30*a*".

FIG. 3 illustrates the relationship and the like between the recording head 17 and the medium 30 in a simplified manner as viewed from above. In FIG. 3, the illustration of the platen 19 is omitted. Although not illustrated in FIG. 1 and FIG. 2, in an example illustrated in FIG. 3, the recording head 17 is mounted on a carriage 20. The carriage 20 is movable in a reciprocating manner along the width direction D2 by receiving power from a motor. That is, the recording head 17 ejects ink while moving along the width direction D2 together with the carriage 20, so that the recording on the first surface 30*a* of the medium 30 is performed. The control unit 11 alternately executes the ejection of ink from the recording head 17 accompanying with the movement of the carriage 20, and the transport of a predetermined distance of the medium 30 by the transport unit 16 thus performing the recording on the medium 30.

However, the configuration in which the recording head 17 is moved by the carriage 20 is not essential. For example, the recording head 17 may be configured to be fixed while having a length over a length (medium width) of the medium 30 in the width direction D2, and to perform the recording by ejecting ink to the medium 30 that is transported downstream at a predetermined speed.

In the example illustrated in FIG. 3, a plurality of first rollers 16*a* located upstream of the recording head 17 are provided along the width direction D2. All of the plurality of first rollers 16*a* have the same function, and it may be construed that the plurality of first rollers 16*a* rotate in synchronization. In the same manner, in the example illustrated in FIG. 3, a plurality of third rollers 16*c* located downstream of the recording head 17 are provided along the width direction D2. All of the plurality of third rollers 16*c* have the same function, and it may be construed that the plurality of third rollers 16*c* rotate in synchronization. Although not illustrated in FIG. 3, as a matter of course, a plurality of second rollers 16*b* are provided at respective positions corresponding to the plurality of first rollers 16*a* and below the medium 30. In the same manner, although not illustrated in FIG. 3, a plurality of fourth rollers 16*d* are provided at respective positions corresponding to the plurality of third rollers 16*c* and below the medium 30.

The printing device 10 may be realized not only by an independent single printer, or may be realized by a plurality of devices communicably coupled to each other. For example, the recording device 10 may be realized by a system that includes an information processing device including the control unit 11, and a printer including the transport unit 16 and the recording head 17. The recording device 10 may be referred to as a liquid ejection device, a printing apparatus, an inkjet printer, or the like.

2. Pattern Formation:

Next, the pattern forming step according to the present embodiment is described. In the pattern forming step, the control unit 11 forms a "first pattern" by liquid on the first surface 30*a* of the medium 30 by controlling the ejection of liquid by the recording head 17, and forms a "detection region" for the first pattern at a specific position on the first surface 30*a* at which the third roller 16*c* is brought into contact when a rotational angle of the third roller 16*c* becomes m °+360° with respect to a rotational angle m ° of the third roller 16*c* when the third roller 16*c* is brought into contact with the first pattern. That is, in the pattern forming step, at least the first pattern and the detection region are formed on the first surface 30*a*.

Here, "a specific position with which the third roller 16*c* is brought into contact when the rotation angle of the third roller 16*c* becomes m °+360° with respect to the rotational angle m ° of the third roller 16*c* when the third roller 16*c* is brought into contact with the first pattern" can be paraphrased as a position with which the third roller 16*c* is brought into contact when the third roller 16*c* is rotated by one turn from a state in which the third roller 16*c* is brought into contact with the first pattern. Accordingly, in practice, what is used as reference for determining the rotational angle m °, and a type of rotational angle m ° are not important. Further, the rotation of the roller described in this specification is a rotation for transporting the medium 30 downstream and hence, the detection region is located upstream of the first pattern corresponding to the detection region.

Hereinafter, the pattern including the first pattern and the detection region is referred to as "stain detection pattern". The pattern forming unit 12*a* of the control unit 11 records a stain detection pattern on the first surface 30*a* of the medium 30 based on recording data of a stain detection pattern preliminarily stored in a predetermined memory, by controlling the recording head 17 and the transport unit 16.

First Example

Figure 4:
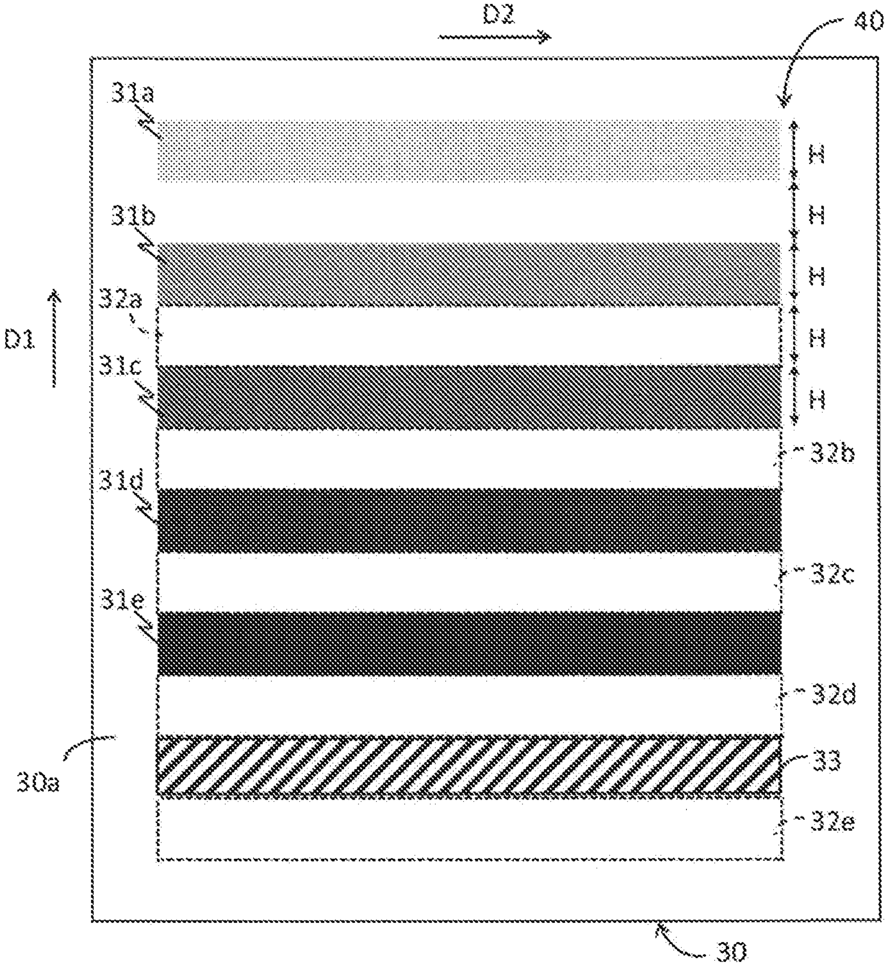
FIG. 4 is a view illustrating a stain detection pattern of a first example.

FIG. 4 illustrates a stain detection pattern 40 according to the first example recorded on the first surface 30*a* of the medium 30 by the pattern forming step. In FIG. 4, a correspondence relationship between the medium 30 and the directions D1 and D2 is also illustrated. In the stain detection pattern 40, a plurality of first patterns 31*a*, 31*b*, 31*c*, 31*d*, and 31*e* are formed so as to be arranged apart from each other in the transport direction D1. It may be construed that each of the first patterns 31*a*, 31*b*, 31*c*, 31*d*, and 31*e* is a rectangular matted pattern elongated in the width direction D2, and all of the first patterns have the same size. It may be construed that the matted pattern is, for example, a pattern in which dots of the ink are disposed uniformly or substantially uniformly, so that there is no gradation or substantially no gradation within the pattern.

A length of the first pattern in the transport direction D1 is set as H. In the transport direction D1, a length in the transport directional of a region, secured between the first pattern and the first pattern in the transport direction D1, is also set as H. Here, in the first example, the relationship H=A/n is established, wherein A is a circumference of the third roller 16*c*.

n is a positive integer, and is suitably an odd number. In the first example, n is set to 3 (n=3). Since the circumference A is already known on the design of a product, the pattern forming unit 12*a* records the stain detection pattern 40 on the medium 30 while assuming one third of the circumference A as the length H.

A distance of H×3 in the transport direction D1 on the medium 30 corresponds to a distance of one rotation of the third roller 16*c*. Therefore, according to FIG. 4, when the first pattern 31*a* is assumed as the reference, a region adjacent to an upstream side of the first pattern 31*b* is a specific position, and this specific position is a detection region 32*a* for the first pattern 31*a*. That is, when the ink of the first pattern 31*a* sticks to the third roller 16*c*, the ink is transferred to the detection region 32*a* due to one rotation of the third roller 16*c*. Accordingly, it is possible to determine whether the concentration of the first pattern 31*a* is appropriate on the recording quality by detecting the stain in the detection region 32*a*.

In this manner, the detection region for the first pattern is a region for detecting the transfer of the ink of the first pattern.

In the same manner, when the first pattern 31*b* is assumed as the reference, a region adjacent to an upstream side of the first pattern 31*c* is a specific position, and this specific position is a detection region 32*b* for the first pattern 31*b*.

When the first pattern 31*c* is assumed as the reference, a region adjacent to an upstream side of the first pattern 31*d* is a specific position, and this specific position is a detection region 32*c* for the first pattern 31*c*. When the first pattern 31*d* is assumed as the reference, a region adjacent to an upstream side of the first pattern 31*e* is a specific position, and this specific position is a detection region 32*d* for the first pattern 31*d*. When the first pattern 31*e* is assumed as the reference, a region located away from the first pattern 31*e* by a distance H×3 toward an upstream side is a specific position, and the specific position is a detection region 32*e* for the first pattern 31*e*.

According to the first example, the detection regions 32*a*, 32*b*, 32*c*, 32*d*, and 32*e* are "non-recording region" where liquid is not ejected from the recording head 17. The non-recording region is, per se, the surface of the medium 30, and is also referred to as "blank region". By setting the detection region as the blank region, the presence or absence of transfer of the ink of the first pattern and the degree of transfer of the ink can be easily detected. In the present embodiment, "ensuring of the blank region as the detection region between the first patterns" is also referred to as "forming of the detection region".

In FIG. 4, each of the detection regions 32*a*, 32*b*, 32*c*, 32*d*, and 32*e* is illustrated by being surrounded by a broken-line frame for making it easy to see, but such a frame may be present or may not be present in an actual stain detection pattern 40.

As can be understood from FIG. 4, the plurality of first patterns 31*a*, 31*b*, 31*c*, 31*d*, and 31*e* are different from each other in concentration. By recording the plurality of first patterns 31*a*, 31*b*, 31*c*, 31*d*, and 31*e* that are different from each other in concentration, it is possible to determine the concentration at which a stain attributed to sticking of ink to the third roller 16*c* is not generated.

Further, as can be understood from FIG. 4, the pattern forming unit 12*a* forms the plurality of first patterns 31*a*, 31*b*, 31*c*, 31*d*, and 31*e* such that the concentrations of the first patterns are increased in a stepwise manner from the downstream side to the upstream side. According to FIG. 4, among the plurality of first patterns 31*a*, 31*b*, 31*c*, 31*d*, and 31*e*, the first pattern 31*a* on the most downstream side has the lowest concentration, and the first pattern 31*e* located most upstream has the highest concentration. When the high-concentration first pattern is recorded prior to the low-concentration first pattern, there is a concern that the ink sticking to the third roller 16*c* from the high-concentration first pattern partially remains on the third roller 16*c* even after the ink is transferred to the corresponding detection region so that the remaining ink affects the detection of a stain relating to other first patterns. In view of the above, in order to avoid such a problem, a plurality of first patterns are formed such that the concentrations of the first patterns are increased in a stepwise manner from the downstream side to the upstream side.

Recording data that the pattern forming unit 12*a* uses for recording the stain detection pattern 40, of course, defines a different concentration with respect to each of the first patterns 31*a*, 31*b*, 31*c*, 31*d*, and 31*e*. In a state of the recording data, one first pattern is expressed as a set region of pixels having the same concentration. Each pixel constituting the recording data has, for example, a gradation value for each color of CMYK. The gradation value is a value expressed by 256 gradations, that is, 0 to 255, for example, and 0 corresponds to the concentration of 0%, and 255 corresponds to the concentration of 100%. Accordingly, the pixel may take a concentration of 400% at maximum when the gradation values of the CMYK are added to each other.

In the first example, all of the first patterns 31*a*, 31*b*, 31*c*, 31*d*, and 31*e* are patterns that are recorded by mixing CMYK inks. Accordingly, the concentration of the first pattern is the density of the pixels constituting the first pattern in the recording data. As a matter of course, the pattern forming unit 12*a* performs a so-called halftone processing or the like on the recording data thus converting the recording data into data in which dot ejection (dot on) or dot non-ejection (dot off) is defined for each pixel and each ink color. Thereafter, the pattern forming unit 12*a* supplies the converted data to the recording head 17 thus causing the recording head 17 to record the stain detection pattern 40.

The pattern forming unit 12*a* records the stain detection pattern 40 on the medium 30 in a state where the plurality of first patterns 31*a*, 31*b*, 31*c*, 31*d*, and 31*e* include the first pattern whose concentration is set to a preset maximum value. In FIG. 4, the first pattern 31*e* located most upstream corresponds to the first pattern whose concentration is set to the maximum value. In this specification, the maximum value of the concentration is a concentration that can be realized by the recording head 17, and is a concentration set by taking into account characteristics of ink such as blurring of ink on the medium 30. As in the case of the above-mentioned example, when the recording head 17 can perform color printing by mixing inks of colors of CMYK, the pixel of the recording data can take a concentration of 400% at maximum. However, the maximum value of the concentration in this specification is set to a value lower than 400% such as 300% or 250%, for example.

According to the first example described above, the pattern forming unit 12*a* forms a plurality of first patterns side by side in the transport direction D1 in a region having a length corresponding to the circumference of the third roller 16*c* in the transport direction D1 of the medium 30. Here, the plurality of first patterns each have a length H, in the transport direction D1, corresponding to a value obtained by diving the circumference by a positive integer n, and the plurality of first patterns are different from each other in concentration. For example, the first pattern 31*a* and the first pattern 31*b* are formed in a region having a length corresponding to the circumference of the third roller 16*c* on the first surface 30*a*. The pattern forming unit 12*a* forms a detection region having a length in the transport direction D1 corresponding to the length H of the first pattern at each of a plurality of specific positions respectively corresponding to the plurality of first patterns. "The length of the transport direction D1 corresponds to the length H of the first pattern" means that the length in the transport direction D1 is equal to or substantially equal to the length H of the first pattern. In this manner, by disposing the plurality of first patterns in the region having the length corresponding to the circumference of the third roller 16*c*, the stain detection pattern can be made compact and hence, it is possible to contribute to the suppression of medium consumption and the reduction of reading time of the pattern.

According to FIG. 4, the detection region 32*d* for the first pattern 31*d* and the detection region 32*e* for the first pattern 31*e* are located upstream of the first pattern 31*e* located most upstream, and are not sandwiched between the first patterns respectively. Further, in the first example, the first pattern is the blank region. Accordingly, it is difficult for a user to grasp positions of the detection region 32*d* and the detection region 32*e* on the medium 30. In view of such circumstances, the pattern forming unit 12*a* may be configured to form the third pattern 33 in a region between the detection region 32*e* located most upstream in the transport direction D1 of the first surface 30*a* and the detection region 32*d* located second most upstream succeeding to the detection region 32*e* located most upstream by causing the recording head 17 to eject ink.

That is, the pattern forming unit 12*a* may be configured to record the stain detection pattern 40 including the third pattern 33 on the first surface 30*a* of the medium 30. In FIG. 4, for the sake of convenience, the third pattern 33 is indicated by hatching for distinguishing the third pattern 33 and the first patterns 31*a*, 31*b*, 31*c*, 31*d*, and 31*e* from each other. By recording the third pattern 33, the user can easily grasp positions of the detection region 32*d* and the detection region 32*e* that are the blank regions. Here, the third pattern 33 does not need to be a matted pattern, provided that the third pattern 33 consequently functions as a mark for facilitating grasping of the positions of the detection region 32*d* and the detection region 32*e*, the third pattern 33 may have any color, pattern, and shape.

3. Treatment after Pattern Forming Step:

After the pattern forming step, a stain detection step and an injection amount setting step are performed. The stain detection step and the injection amount setting step are briefly described.

In the stain detection step, a stain attributed to transfer of the ink is detected by reading the first surface 30*a* of the medium 30 on which the stain detection pattern is recorded by the recording device 10. As a matter of course, the medium 30 on which the stain detection pattern is recorded by the recording device 10 is the medium 30 discharged by the transport by the transport unit 16 after recording by the recording head 17. Accordingly, there is a possibility that a stain is generated on the medium 30 due to sticking of the ink to the third roller 16*c*. The stain detection step may be a step where a person visually detects the stain, or may be a step where the detection is performed using a reading apparatus such as a scanner or a colorimeter. In the stain detection step, for example, a user detects the degree of stain in the detection region by visual confirmation. Alternatively, in the stain detection step, for example, the scanner reads the first surface 30*a* of the medium 30, and detects the degree of stain by comparing the degree of stain in the detection region in the reading data with a predetermined threshold, or the like.

In the injection amount setting step, the injection amount setting unit 12*b* of the control unit 11 acquires a detection result of the stain detection step. For example, when the user inputs the detection result by operating the operation receiving unit 14, the injection amount setting unit 12*b* can acquire the detection result. Alternatively, the injection amount setting unit 12*b* can acquire the detection result from the scanner or the like coupled to the recording device 10. Alternatively, the injection amount setting unit 12*b* may be configured to input the reading data of the first surface 30*a* of the medium 30 from the scanner or the like, analyze the reading data, and acquire the degree of stain of the detection region as a detection result.

The injection amount setting unit 12*b* sets an injection amount (ejection amount) of ink corresponding to the acquired detection result. Assume that the injection amount setting unit 12*b* acquires a detection result that there is no stain of ink in the detection regions 32*a*, 32*b*, and 32*c*, and there is a stain attributed to ink in the detection regions 32*d*, 32*e*, for example. In this case, when a concentration equal to or more than the concentration of the first pattern 31*d* is adopted, the lowering of recording quality such as a stain attributed to sticking of ink to the third roller 16*c* occurs. Accordingly, for example, the injection amount setting unit 12*b* sets an upper limit of a concentration that can be taken by the recording data for driving the recording head 17 to a concentration of the first pattern 31*c* or a concentration equal to or more than the concentration of the first pattern 31*c* and less than the concentration of the first pattern 31*d* and, thereafter, such setting is applied in recording various images that the user wants to record. As a result, a stain of the medium by the ink caused by sticking of the ink to the third roller 16*c* can be eliminated. Further, the upper limit of the injection amount of ink by the recording head 17 is not required to be lower than necessary and hence, the lowering of color developing property of the recording result can be suppressed so that the recoding quality can be maintained.

4. Other Examples

Second Example

Figure 5:
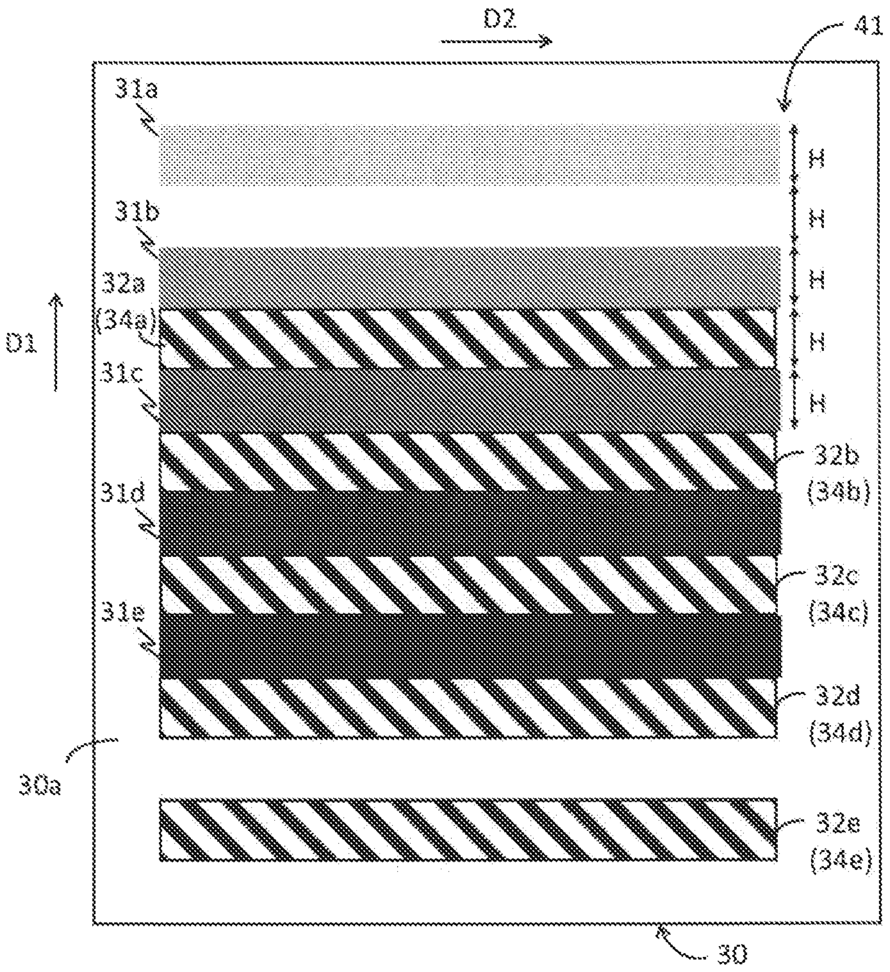
FIG. 5 is a view illustrating a stain detection pattern of a second example.

FIG. 5 illustrates a stain detection pattern 41 according to the second example recorded on the first surface 30*a* of the medium 30 by the pattern forming step. In the second example, and third and fourth examples described below, a point that makes a stain detection pattern 41, 42, 43 different from the stain detection pattern 40 of the first example will be described.

The detection region may not be a non-recording region (blank region) but may be a second pattern formed by ejecting ink. That is, the pattern forming unit 12*a* may be configured to record the stain detection pattern 41 including a first pattern and a second pattern on the first surface 30*a* based on the recording data of the stain detection pattern 41 by controlling the recording head 17 and the transport unit 16. In the example illustrated in FIG. 5, the detection region 32*a* for the first pattern 31*a* is a second pattern 34*a*. In the same manner, the detection region 32*b* for the first pattern 31*b* is a second pattern 34*b*, the detection region 32*c* for the first pattern 31*c* is a second pattern 34*c*, the detection region 32*d* for the first pattern 31*d* is a second pattern 34*d*, and the detection region 32*e* for the first pattern 31*e* is a second pattern 34*e*.

In FIG. 5, for the sake of convenience, in order to distinguish the first patterns 31*a*, 31*b*, 31*c*, 31*d*, and 31*e* and the second patterns 34*a*, 34*b*, 34*c*, 34*d*, and 34*e* from each other, the second patterns 34*a*, 34*b*, 34*c*, 34*d*, and 34*e* are indicated by hatching that is different from the one applied to the third pattern 33. The detection region is a region for detecting the presence or absence of sticking of ink of the first pattern and the degree of sticking of ink and hence, even when the first patterns 31*a*, 31*b*, 31*c*, 31*d*, and 31*e* are formed in any color, the pattern forming unit 12*a* forms the second patterns 34*a*, 34*b*, 34*c*, 34*d*, and 34*e* in different color from that of the first patterns 31*a*, 31*b*, 31*c*, 31*d*, and 31*e*.

In order to make sticking of ink of the first patterns 31*a*, 31*b*, 31*c*, 31*d*, and 31*e* conspicuous, for example, the pattern forming unit 12*a* may form the second patterns 34*a*, 34*b*, 34*c*, 34*d*, and 34*e* in color having the lower concentration than that of the first patterns 31*a*, 31*b*, 31*c*, 31*d*, and 31*e*.

Further, in order to make sticking of ink of the first patterns 31*a*, 31*b*, 31*c*, 31*d*, and 31*e* conspicuous, for example, the pattern forming unit 12*a* may form the second patterns 34*a*, 34*b*, 34*c*, 34*d*, and 34*e* in color corresponding to color complementary to the color of the first patterns 31*a*, 34*b*, 34*c*, 34*d*, and 31*e*.

When the medium 30 is formed of a transparent film, the recording device 10 forms a base on the transparent film using a white ink, and performs recording on the base using other color inks such as inks of CMYK. Here, the pattern forming unit 12*a* may be configured to form the second patterns 34*a*, 34*b*, 34*c*, 34*d*, and 34*e* using the white ink by causing the recording head 17 to eject the white ink. That is, unlike the case of the first example in which the detection region is formed in the color of the medium 30 per se, a configuration may be adopted where, by forming the detection region using a white image formed using the white ink, the transfer of the ink from the first pattern can be more clearly recognized. As a matter of course, whether or not the medium 30 is formed of a transparent film, the detection region can be formed of a white image using the white ink.

Although not illustrated in FIG. 5, the stain detection pattern 41 may include the third pattern 33 in the same manner as the stain detection pattern 40.

Third Example

Figure 6:
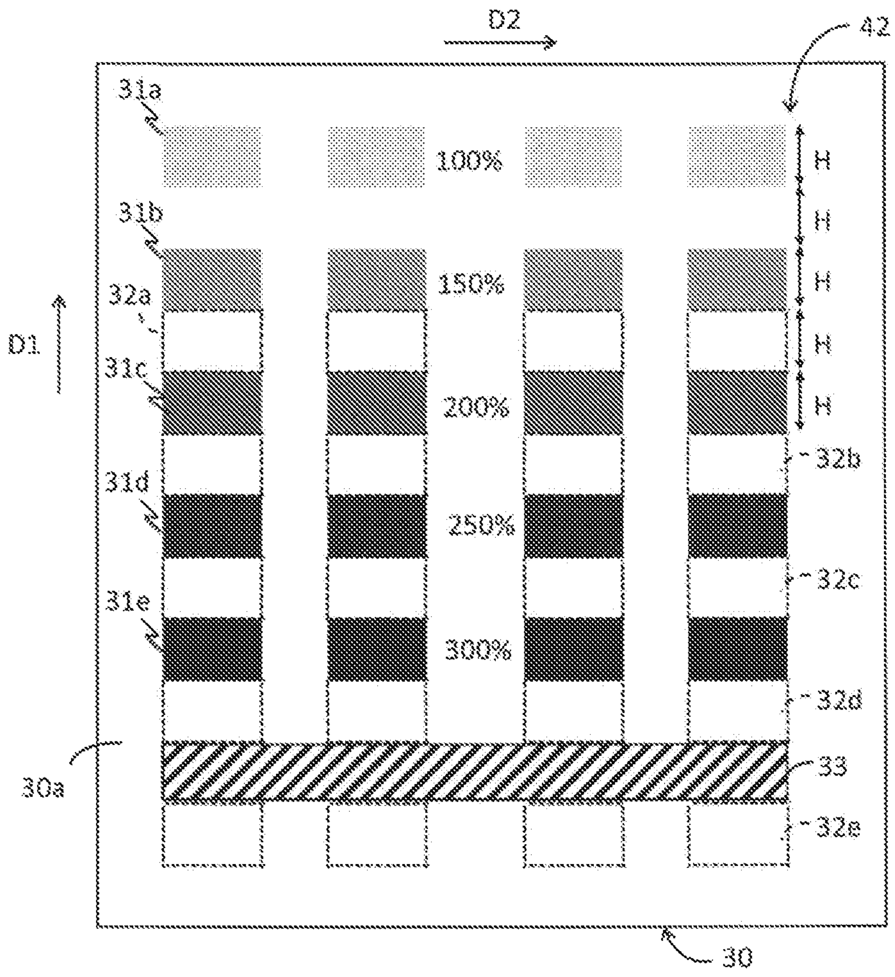
FIG. 6 is a view illustrating a stain detection pattern of a third example.

FIG. 6 illustrates a stain detection pattern 42 according to the third example recorded on the first surface 30*a* of the medium 30 by the pattern forming step.

The first pattern is recorded for contacting with the third roller 16*c*. In other words, it is not necessary to record the first pattern at a position that does not contact with the third roller 16*c*. As illustrated in FIG. 3, the plurality of third rollers 16*c* are disposed in a spaced apart manner in the width direction D2 at a downstream position of the recording head 17.

Accordingly, the pattern forming unit 12*a* may be configured to record the stain detection pattern 42 on the first surface 30*a* by controlling the recording head 17 such that the first pattern is positioned corresponding to a plurality of predetermined positions at which the third rollers 16*c* exist in the width direction D2. When the stain detection pattern 42 is compared with the stain detection pattern 40, the stain detection pattern 42 differs from the stain detection pattern 40 with respect to a point that the first patterns 31*a*, 31*b*, 31*c*, 31*d*, and 31*e* and the detection regions 32*a*, 32*b*, 32*c*, 32*d*, and 32*e* are respectively formed in a spaced apart manner in the width direction D2 corresponding to the plurality of predetermined positions at which the third rollers 16*c* exist. As a matter of course, also in the third example, the detection regions 32*a*, 32*b*, 32*c*, 32*d*, and 32*e* may not be formed of a blank region, and may be formed of a second pattern. In this manner, by recording the first pattern corresponding to the plurality of predetermined positions at which the third rollers 16*c* exist in the width direction D2, the consumption of ink can be suppressed in performing recording of the stain detection pattern.

Further, the pattern forming unit 12*a* may be configured such that the recording head 17 records the indication of concentrations of the first patterns 31*a*, 31*b*, 31*c*, 31*d*, and 31*e* in a region on the first surface 30*a* avoiding the first patterns 31*a*, 31*b*, 31*c*, 31*d*, and 31*e* in the width direction D2, together with the recording of the first patterns 31*a*, 31*b*, 31*c*, 31*d*, and 31*e*. "The region avoiding the first pattern in the width direction D2" means a region where the first pattern is not recorded, and means a region adjacent to the first pattern in the width direction D2.

In the example illustrated in FIG. 6, concentrations of the respective first patterns 31*a*, 31*b*, 31*c*, 31*d*, and 31*e* are recorded in the region avoiding the first patterns 31*a*, 31*b*, 31*c*, 31*d*, and 31*e* in the width direction D2 in numbers such as, for example, 100%, 150%, 200%, 250%, and 300%. These concentrations are values defined as the concentrations of the respective first patterns 31*a*, 31*b*, 31*c*, 31*d*, and 31*e* in the recording data of the stain detection pattern. Since such concentrations are recorded on the first surface 30*a*, the user can recognize the concentration of the first pattern more directly.

As a matter of course, also in the first example and the second example, the pattern forming unit 12*a* may be configured to record such an indication of the concentration on the first surface 30*a* together with the first pattern.

Fourth Example

Figure 7:
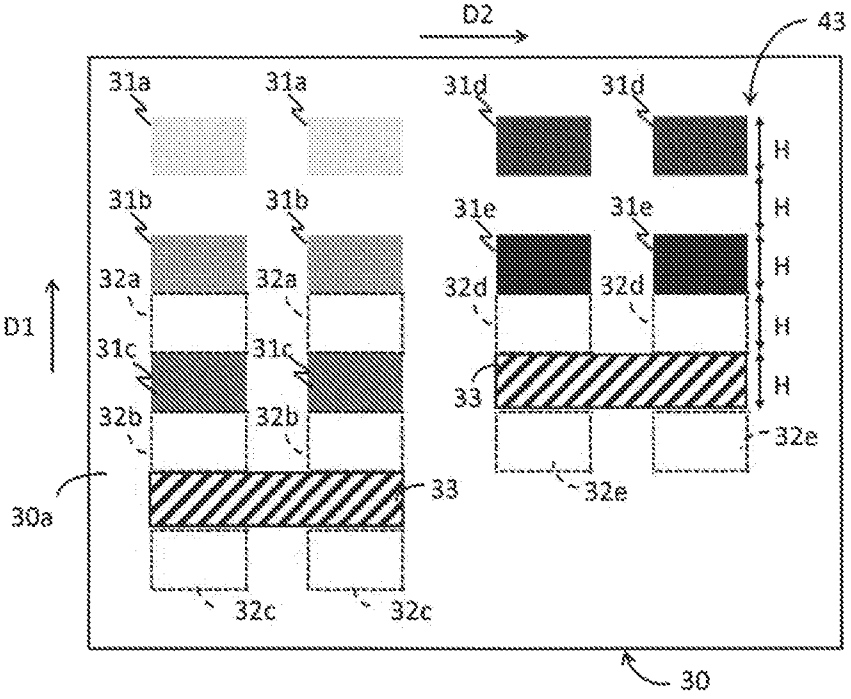
FIG. 7 is a view illustrating a stain detection pattern of a fourth example.

FIG. 7 illustrates a stain detection pattern 43 according to the fourth example recorded on the first surface 30*a* of the medium 30 by the pattern forming step.

The pattern forming unit 12*a* may be configured to form, side by side, a plurality of first patterns that are different from each other in concentration in the width direction D2 by controlling the recording head 17. According to the stain detection pattern 43, although the first patterns 31*a*, 31*b*, and 31*c* are aligned in a spaced apart manner along the transport direction D1 as described above, the first pattern 31*d* is aligned with the first pattern 31*a* in the width direction D2, and the first pattern 31*e* is aligned with the first pattern 31*b* in the width direction D2. Also in the stain detection pattern 43, the relative positional relationship between the first pattern 31*d* and the detection region 32*d* for the first pattern 31*d*, and the relative positional relationship between the first pattern 31*e* and the detection region 32*e* for the first pattern 31*e* are as described above.

In this manner, by forming, side by side, the plurality of first patterns that are different from each other in concentration in the width direction D2, the consumption of the medium 30 required to record the stain detection pattern can be suppressed. As a matter of course, also in the fourth example, the pattern forming unit 12*a* may be configured to form the detection regions 32*a*, 32*b*, 32*c*, 32*d*, and 32*e* by not the blank region but the second pattern, and to record the indication of the concentration on the first surface 30*a* together with the first pattern.

5. Summary:

In this manner, according to the present embodiment, the recording device 10 includes the liquid ejecting unit configured to eject liquid to the first surface 30*a* of the medium 30 transported in the transport direction D1, the roller (the third roller 16*c*) that is disposed downstream of the liquid ejecting unit in the transport direction D1 and configured to rotate in contact with the first surface 30*a*, and the controller 11. The control unit 11 is configured to form the first pattern of the liquid on the first surface 30*a* by controlling ejection of the liquid by the liquid ejecting unit, and to form a detection region for the first pattern at a specific position on the first surface 30*a* with which the roller is brought into contact when a rotational angle of the roller becomes m °+360°, m ° being a rotational angle of the roller when the roller is brought into contact with the first pattern.

According to the configuration described above, when the liquid ejected to the first surface 30*a* for forming the first pattern sticks to the roller, the liquid sticking to the roller is transferred to the detection region when the roller is rotated by one turn. Accordingly, by detecting a stain in the detection region, it is possible to detect the effect of sticking of the liquid to the roller on the recording result. Further, by utilizing this detection result, the ejection amount of the liquid by the liquid ejecting unit can be easily set to an appropriate value. Further, by detecting the stain in the detection region, it is possible to make the setting such that such a stain does not occur and hence, it is not necessary to adopt a configuration, as disclosed in JP-A-2014-141027, in which an indentation is generated by biting of a tooth portion of a spur into a medium.

Further, according to the present embodiment, the control unit 11 may be configured such that the liquid ejecting unit records the indication of the concentration of the first pattern in the region of the first surface 30*a* avoiding the first pattern in the width direction D2 that intersects with the transport direction D1.

According to the configuration described above, since the indication of the concentration of the first pattern is recorded by using the region adjacent to the first pattern in the width direction D2, the user can easily recognize the concentration of the first pattern.

Although it may be construed that the region for recording the indication of the concentration of the first pattern is, basically, a part of the blank region, for example, the region may be a region in which a base is recorded using a white ink or the like in order to make the characters for displaying the concentration conspicuous.

Further, according to the present embodiment, the control unit 11 may be configured to form, side by side, a plurality of first patterns that are different from each other in concentration in the width direction D2.

According to the configuration described above, the plurality of first patterns can be recorded in a smaller area compared to a case where a plurality of first patterns that are different from each other in concentration are formed side by side only in the transport direction D1 and hence, the consumption of the medium 30 can be suppressed.

Further, according to the present embodiment, the detection region may be a non-recording region in which liquid is not ejected from the liquid ejecting unit.

According to the configuration described above, by forming the detection region by the non-recording region, that is, the blank region, the stain in the detection region can be detected more easily.

Further, according to the present embodiment, the second pattern is formed in the detection region in color corresponding to a color complementary to a color of the first pattern by the liquid ejecting unit.

According to the configuration described above, by forming the detection region by the second pattern of the color complementary to the color of the first pattern, the stain in the detection region can be detected more easily.

Further, according to the present embodiment, the control unit 11 is configured to form the plurality of first patterns side by side in the transport direction D1 in a region having a length corresponding to the circumference A of the roller in the transport direction D1 of the medium 30, the plurality of first patterns each having a length H, in the transport direction D1, corresponding to a value obtained by diving the circumference A by a positive integer n, and the plurality of first patterns being different from each other in concentration, and to form the detection region having a length in the transport direction D1 corresponding to the length H of the first pattern at each of a plurality of the specific positions respectively corresponding to the plurality of first patterns.

According to the configuration described above, the plurality of first patterns can be recorded in a smaller area compared to a case where the plurality of first patterns that are different from each other in concentration are formed side by side in the transport direction D1 and hence, the consumption of the medium 30 can be suppressed.

Further, according to the present embodiment, the integer n may be an odd number.

By setting the integer n to be an odd number, for example, 3 or 5, the first pattern and the detection region can be alternately disposed in a region having a length corresponding to the circumference A of the roller in the transport direction D1 of the medium 30.

However, the disclosure of this embodiment does not deny that an integer n is an even number. For example, it may be adopted a configuration where the length H is set to A/4 (H=A/4), a first pattern in which a length in the transport direction D1 is set to H is formed on the first surface 30*a*, and a detection region in which a length in the transport direction D1 is set to H is formed at a specific position that uses the first pattern as the reference.

Further, a configuration is also conceivable where only one first pattern is formed in a region having a length corresponding to the circumference A in the transport direction D1 of the medium 30. That is, it may be adopted a configuration where the length H is set to A (H=A), a first pattern in which a length in the transport direction D1 is set to H is formed on the first surface 30*a*, and a detection region in which a length in the transport direction D1 is set to H is formed at a specific position that uses the first pattern as the reference.

Further, according to the present embodiment, the control unit 11 may be configured to form the plurality of the first patterns such that the concentrations of the first patterns are increased in a stepwise manner from the downstream side to the upstream side in the transport direction D1.

According to the configuration, it is possible to avoid the occurrence of a phenomenon that even after the ink sticking to the roller from the first pattern having the high concentration is transferred to the corresponding detection region, the ink is transferred to other first patters and other detection regions thus adversely affecting the detection of the stain.

Further, according to the present embodiment, the control unit 11 may be configured to include the first pattern in which the concentration is set to a preset maximum value among the plurality of the first patterns.

According to the configuration described above, by including the first pattern in which the concentration is set to the preset maximum value in the plurality of first patterns, it is possible to verify whether it is appropriate to adopt the concentration of the maximum value to the recording based on the stain in the detection region.

Further, according to the present embodiment, the control unit 11 may be configured to form the third pattern 33 in a region between the detection region located most upstream in the transport direction D1 of the first surface 30*a* and the detection region located second most upstream succeeding to the detection region located most upstream by controlling ejection of the liquid by the liquid ejecting unit.

According to the configuration described above, the user can easily recognize a position of the detection region located most upstream and a position of the detection region located second most upstream succeeding to the detection region located most upstream by using the third pattern 33 as a mark.

Further, according to the present embodiment, the first patterns 31*a*, 31*b*, 31*c*, 31*d*, and 31*e* may not be a pattern that is recorded by mixing CMYK inks but may be a pattern recorded by single-color ink.

According to the configuration described above, in recording by the single-color ink, a stain on the medium by the ink attributed to sticking of the ink to the third roller 16*c* can be detected, and setting for eliminating such a stain can be made.

The present embodiment is not limited to a recording device and a system, and discloses inventions of various categories such as a method that the recording device or the system performs, and the program 12 that causes the processor to execute the method. For example, the recording method performed by the recording device 10 that includes: the liquid ejecting unit configured to eject liquid to the first surface 30*a* of the medium 30 transported in the transport direction D1, and the roller (third roller 16*c*) disposed downstream of the liquid ejecting unit in the transport direction D1 and configured to rotate in contact with the first surface 30*a*, the recording method comprising a pattern forming step in which a first pattern of the liquid is formed on the first surface 30*a* by the liquid ejecting unit, and a detection region for the first pattern is formed at a specific position on the first surface 30*a* with which the roller is brought into contact when a rotational angle of the roller becomes m °+360°, m ° being a rotational angle of the roller when the roller is brought into contact with the first pattern.

The shapes of various patterns, that is, the first pattern, the second pattern, and the third pattern and the detection regions may be a shape other than a rectangular shape, for example, a circular shape, an elliptical shape or other shapes.

What is claimed is:

1. A recording device comprising:

a liquid ejecting unit configured to eject liquid to a first surface of a medium transported in a transport direction;

a roller disposed downstream of the liquid ejecting unit in the transport direction and configured to rotate in contact with the first surface; and a control unit, wherein the control unit is configured to form a first pattern of the liquid on the first surface by controlling ejection of the liquid by the liquid ejecting unit, and to form a detection region for the first pattern at a specific position on the first surface with which the roller is brought into contact when a rotational angle of the roller becomes m °+360°, m ° being a rotational angle of the roller when the roller is brought into contact with the first pattern.

2. The recording device according to claim 1, wherein the control unit is configured to cause the liquid ejecting unit to record an indication of a concentration of the first pattern in a region of the first surface avoiding the first pattern in a width direction intersecting with the transport direction.

3. The recording device according to claim 1, wherein the control unit is configured to form, side by side, a plurality of the first patterns that differ from each other in concentration in the width direction intersecting with the transport direction.

4. The recording device according to claim 1, wherein the detection region is a non-recording region in which the liquid is not ejected from the liquid ejecting unit.

5. The recording device according to claim 1, wherein a second pattern having a color corresponding to a color complementary to a color of the first pattern is formed in the detection region by the liquid ejecting unit.

6. The recording device according to claim 1, wherein the control unit is configured to form a plurality of first patterns side by side in the transport direction in a region having a length corresponding to a circumference of the roller in the transport direction of the medium, the plurality of first patterns each having a length, in the transport direction, corresponding to a value obtained by diving the circumference by a positive integer n, and the plurality of first patterns being different from each other in concentration, and to form the detection region having a length in the transport direction corresponding to a length of the first pattern at each of a plurality of the specific positions respectively corresponding to the plurality of first patterns.

7. The recording device according to claim 6, wherein the integer n is an odd number.

8. The recording device according to claim 6, wherein the control unit is configured to form the plurality of the first patterns such that the concentration of the first patterns increases in a stepwise manner from downstream to upstream in the transport direction.

9. The recording device according to claim 6, wherein the control unit is configured to include, among the plurality of the first patterns, a first pattern having a concentration at a preset maximum value.

10. The recording device according to claim 6, wherein the control unit is configured to form a third pattern in a region between the detection region located most upstream in the transport direction of the first surface and the detection region located second most upstream succeeding to the detection region located most upstream by controlling ejection of the liquid by the liquid ejecting unit.

11. A recording method performed by a recording device that includes a liquid ejecting unit configured to eject liquid to a first surface of a medium transported in a transport direction, and a roller disposed downstream of the liquid ejecting unit in the transport direction and configured to rotate in contact with the first surface, the recording method comprising a pattern forming step in which a first pattern of the liquid is formed on the first surface by the liquid ejecting unit, and a detection region for the first pattern is formed at a specific position on the first surface with which the roller is brought into contact when a rotational angle of the roller becomes m °+360°, m ° being a rotational angle of the roller when the roller is brought into contact with the first pattern.

* * * * *